COMBINATION DIRECT/FM RECORD AND REPRODUCE SYSTEM

Filed March 30, 1962 2 Sheets-Sheet 1

ROBERT W. ALLINGTON
INVENTOR.

BY Nathan N. Kallman

ATTORNEY

COMBINATION DIRECT/FM RECORD AND REPRODUCE SYSTEM

Filed March 30, 1962

ROBERT W. ALLINGTON
INVENTOR.

BY Nathan N. Kallman

ATTORNEY

United States Patent Office 3,280,270
Patented Oct. 18, 1966

3,280,270
COMBINATION DIRECT/FM RECORD AND REPRODUCE SYSTEM

Robert W. Allington, Mountain View, Calif., assignor to Ampex Corporation, Redwood City, Calif., a corporation of California Filed Mar. 30, 1962, Ser. No. 183,958
9 Claims. (Cl. 179—100.2)

This invention relates to a recording and reproducing system, and in particular to a novel apparatus that affords both direct recording and frequency modulation recording.

Direct recording (hereinafter designated as DR) may be utilized generally for recording a wide frequency spectrum, such as from 50 cycles per second to 40 kilocycles per second, for example. Thus, DR is applicable for recording speech, music and the measurement and spectrum analysis of noise and underwater sound signals. Furthermore, it is possible to achieve multiplexing of a number of signals simultaneously on one track with DR. Also, in a DR system, moderate overloads may be handled, without any sudden increase in distortion over a wide dynamic range. However, the DR system is subject to amplitude instability and is unable to record very low frequency signals down to the D.C. level (direct current).

On the other hand, frequency modulation (hereinafter called FM) recording is not affected by amplitude instability. The FM system can record very low frequencies including D.C., preserves an accurate waveform of the recorded signal, and additionally provides improved phase shift versus frequency characteristics. FM recording may be used for registering transient phenomena, and for systems wherein the frequency components are varied or the time base of the waveform is changed.

Thus, it is apparent that each system has its own advantages and shortcomings, and in many instances it may be desirable to have available in a single apparatus the advantageous features of each. For example, a medical practitioner may wish to record a patient's heartbeat with FM and intersperse or add voice commentary on the same record or magnetic tape by DR.

However, in present day systems, if the operator wishes to switch from one form of recording to another, it is necessary to use separate equipments for the DR or FM operations. This entails additional apparatus with separate electronics or records or tapes that must be edited subsequent to recording, which means added labor, expense and inconvenience. It may be possible to effect a change from DR to FM, or vice versa, by substituting a different electronics system for the one connected to the apparatus, but such change can only be achieved when the apparatus is at rest, i.e., after the mechanical elements and electronics of the recorder have been inactivated.

An object of this invention is to provide a record and reproduce system that affords both direct record and frequency modulation operation with a minimal addition of components.

Another object of the invention is to provide a system that is capable of rapid interchange between the direct record and frequency modulation functions while a storage medium or tape is being scanned during continuous mechanical operation of the apparatus.

According to this invention, a recording system comprises a direct record channel and a frequency modulation channel incorporated in a single apparatus or module in a compatible and operative manner. Each channel is coupled to the same source of input signal and may be selectively coupled to the recording mechanism, such as a magnetic head assembly, through a switching device.

The DR channel is conventional and includes, among other things, means for adding a bias signal to the input signal for application to the recording head assembly. In contrast, the FM channel comprises an oscillator for generating a sawtooth carrier waveform that is modulated by the input signal when the FM channel is operative. A binary divider is coupled to the output of the oscillator to ensure that the modulated output signal from the FM channel is symmetrical. In order to facilitate the use of common electronics, record and reproduce head gaps, and the like for both DR and FM signals, it is a feature of applicant's invention that the heretofore-known saturation recording methods used for FM have been replaced with a system whereby the FM signal being applied to the record head is attenuated to the same linear operating range used by DR signals. Thereafter the symmetrical FM signal is added to an adjusted bias signal (preferably, from the same source as the DR bias) and directed to the head and gap to be recorded on a storage medium. Non-saturation FM recording has the advantages that cross-talk from FM to DR channels is avoided, that the FM can be erased by the bias of later superposed signals (saturated tape permits only partial erasure), and that the use of common components isolates the DR-FM switch from the head, thus cutting down the effect of switching transients at the head.

Similarly, the reproduce system comprises a conventional DR channel that includes preamplifier, equalization and output amplifier circuits coupled between the reproduce head assembly and a utilization circuit. The FM channel of the reproduce system may be selected for operation by means of a switching device, thereby eliminating the amplitude equalization circuit but retaining the use of the same preamplifier and output amplifier circuitry. The use of bias in FM as well as DR makes possible the use of a common preamplifier, so that the output circuit avoids switching transients in the weak output signal from the head and allows switching to be performed at a point relatively remote from the head, as shown in FIGURE 2.

The invention will be described in greater detail with reference to the drawing in which.

Figures 1, 2:
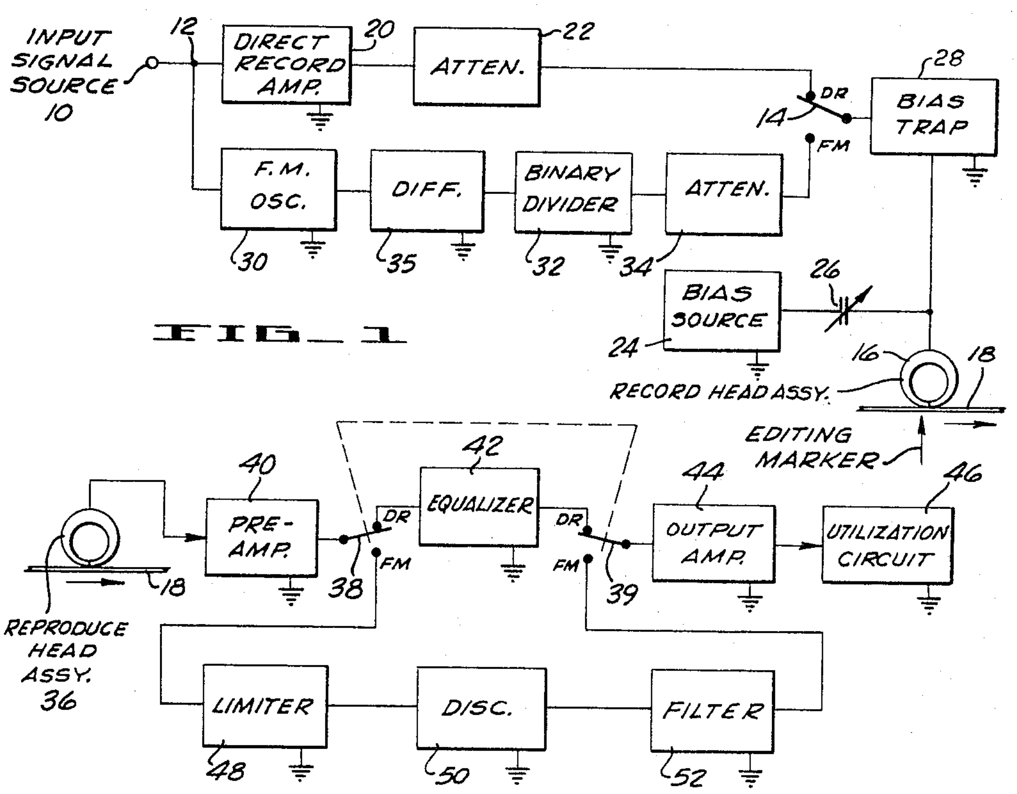
FIGURE 1 is a block diagram of the record system, according to this invention.
FIGURE 2 is a block diagram of the reproduce system of this invention.
Figure 3:
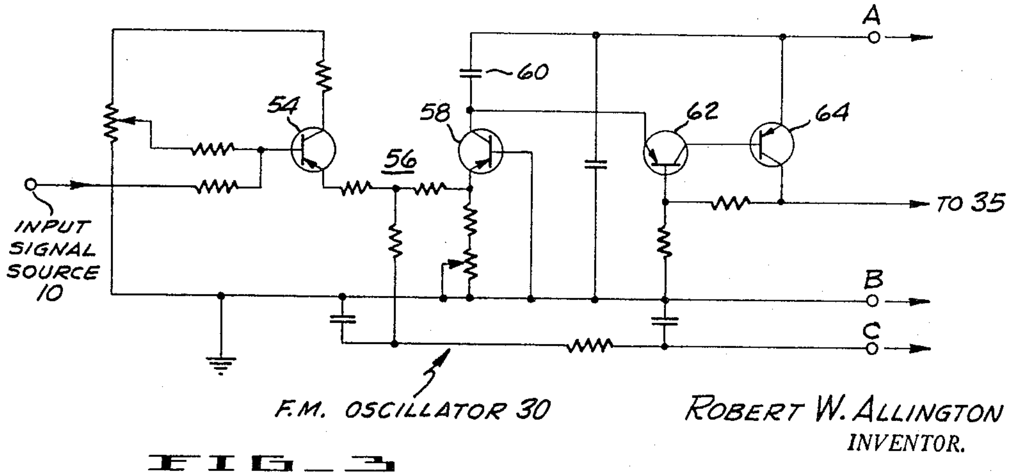
Figure 4:
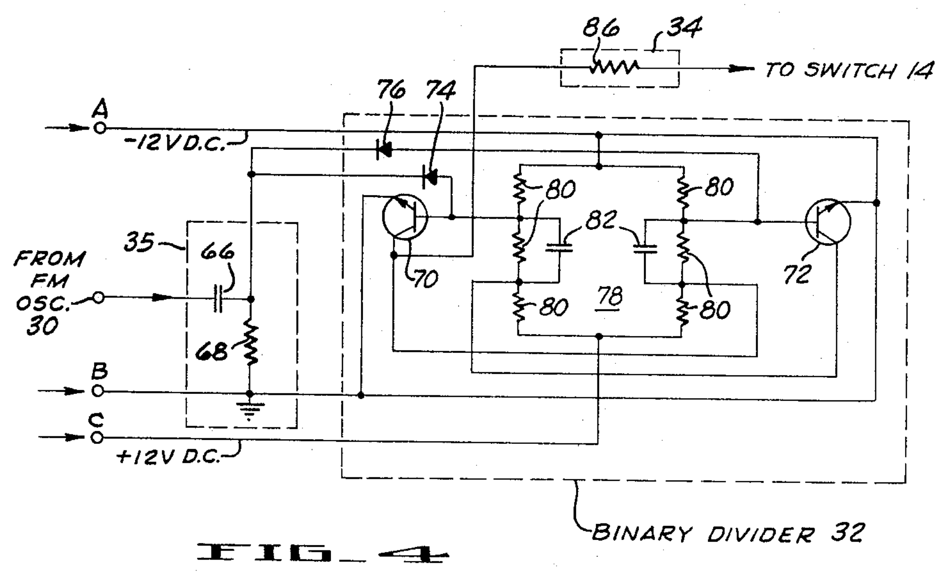

FIGURES 3 and 4 constitute a schematic circuit diagram representing component stages of the record system of FIGURE 1; and FIGURES 5A–D are waveforms that serve to illustrate the operaton of the circuit illustrated in FIGURES 3 and 4.

In FIGURE 1, an embodiment of this invention comprises a record system that receives an input signal to be recorded from a signal source 10. The input signal is fed to a junction 12 at which the DR and FM channels are tied in parallel.

In accordance with this invention, the operator may select either the DR or FM record function by means of a switching device 14. Selection and change from one function to the other may be accomplished although the mechanical parts of the recording apparatus, such as the tape capstan and tape reels, are still operating and in motion. The change occurs in the electronic system whereby either the DR channel or the FM channel is coupled to a recording head assembly 16 that serves to scan a magnetic medium or tape 18. The aforementioned mechanical parts are not shown for convenience and expediency, since such are well known in the art.

The operator may mark the recorded tape with editing markers or recorded pulses (not shown) to designate the type of signal (DR or FM) that is being recorded for any given area of the tape. Thus, during playback, one may switch to the suitable function DR or FM, as indicated by the editing marker or pulse.

During recording, when the switch 14 is in the DR position (as shown in FIGURE 1) and the DR channel is operative, the input signal is amplified by an amplifier 20 and passes through a variable resistance or attenuator 22 that controls the signal level. Simultaneously, a bias signal is derived from a source 24 through a variable capacitor 26 and applied to the circuit associated with the recording head assembly 16. A bias trap 28 is coupled between the switch 14 and bias source 24 to prevent feed-through of bias signal to the attenuator 22 and amplifier 20. The DR portion of the inventive system described herein is conventional in operation, and employs well known components.

Figure 5:
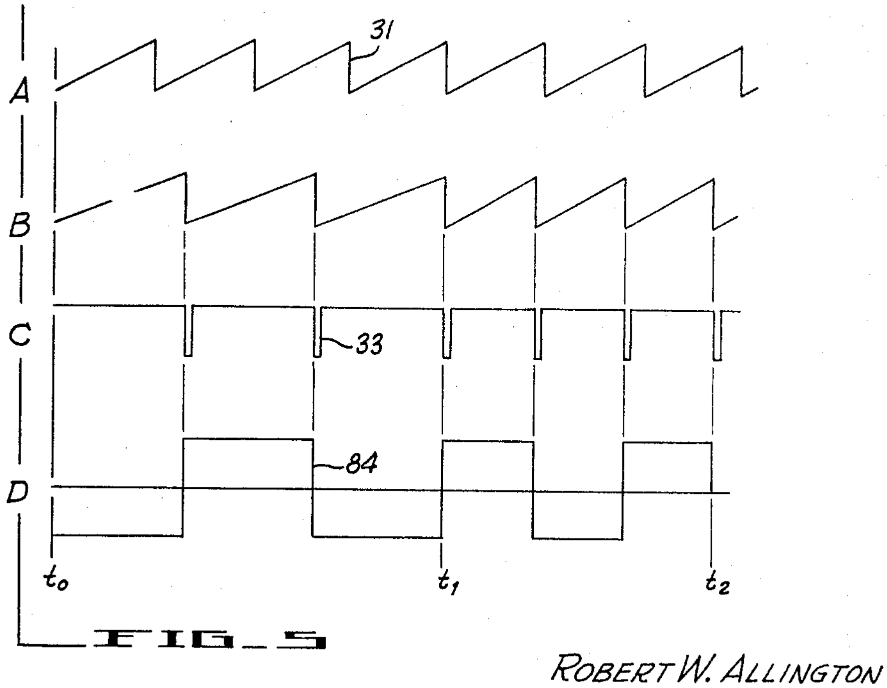

When the switch 14 is in the FM position, the input signal from the source 10 is channeled to an FM oscillator 30 that generates a sawtooth carrier waveform 31 (FIGURE 5A) having a predetermined frequency. The input signal modulates the sawtooth carrier, varying the frequency of the carrier in accordance with the amplitude and polarity of the input signal (FIGURE 5B). Thus, when the input signal is negative, the frequency of the sawtooth output from the oscillator 30 is decreased as shown for the period $t_0$–$t_1$ in FIGURE 5B, and conversely a positive input signal increases the frequency of the sawtooth output, as illustrated for the period $t_1$–$t_2$ in FIGURE 5B. A sharp negative pulse 33 (FIGURE 5C) is developed by a differentiator 35 in response to the steep slope of the trailing edge of each sawtooth waveform derived from the oscillator 30 and is applied to a binary divider 32 that provides a square wave output (FIGURE 5D) representing the FM signal. The FM signal is then fed through an attenuator 34, the switch 14 and the bias trap 28 to the recording head assembly 16. A suitable bias signal is derived from the source 24 through the variable capacitor 26 to be added to the FM signal, and the added signal is then recorded on the tape 18.

In FIGURE 2, a playback system that is capable of reproducing a signal recorded by DR or FM is shown. It is to be understood that if an information signal is recorded by DR, then it is necessary that playback be achieved by DR only. However, an FM record signal may be processed either by the FM channel for demodulation, or by the DR channel to provide a reproduction of the recorded FM signal without demodulation.

The playback system of FIGURE 2 comprises a DR channel that receives a transduced signal from a reproduce head 36 that scans the recorded medium or tape 18. When a switch 38 and a switch 39 are in the DR position, the transduced signal is passed through a preamplifier 40 to an equalizer 42 that provides amplitude equalization as the frequency of the signal varies with the equalized signal being fed to an amplifier 44 and subsequently to a utilization circuit 46 for reproduction, or other use. The reproduced and processed signal will then be a direct representation of the recorded signal, in such case.

However, if a recorded FM signal is to be demodulated, as indicated by the aforementioned tape marking, then the switches 38 and 39 are set for FM operation, and the transduced signal is passed through the preamplifier 40 to a limiter 48 in the FM reproduce channel. The limiter

48 eliminates amplitude distortion, which would otherwise appear as noise, from the FM signal, and a frequency discriminator 50 demodulates the FM carrier to detect the information signal that was supplied to the input source 10 in the recording mode. The detected signal is then processed through a filter 52 that passes only those signals in the desired range of interest to the previously referenced output amplifier 44 and utilization circuit 46.

In a successful application of the invention, the system employed a bias signal of approximately 250 kilocycles per second with a tape speed of 15 inches per second. Signals ranging from 50 cycles to 40 kilocycles per second were recorded and reproduced by the DR process, whereas signals from D.C. to 2400 cycles per second were processed by FM. For FM recording, a carrier of 13.5 kilocycles per second was employed with a maximum excursion up to 18.9 kilocycles. In the playback system, the low pass filter 52 served to pass signals from D.C. to 2400 cycles in the FM reproduce channel. The preamplifier 40 employed a push-pull input from a center-tapped reproduce head 36 to eliminate hum.

The schematic circuits of FIGURES 3 and 4 depict the FM oscillator 30, the differentiator 35, and the binary divider 32 respectively, of the FM record channel shown in FIGURE 1. In FIGURE 3, the input signal from source 10 is applied to the base of a transistor 54 that amplifies the signal. The transistor amplifier 54 is emitter coupled through a resistive network 56 to a transistor 58 that serves as a constant current device for charging a capacitor 60 coupled to the output electrode or collector of the transistor 58.

When the voltage at the collector of transistor 58 reaches a predetermined voltage level, a pair of transistors 62 and 64, which are coupled to the output of transistor 58 and the capacitor 60, begin to conduct. When conducting, transistors 62 and 64 serve as a regenerative switch to discharge the capacitor 60. Upon discharge, a new cycle starts and the capacitor 60 is charged again by the output from transistor 58. In this manner, an oscillating condition is established resulting in the sawtooth waveform output 31 (FIGURE 5A). The frequency of oscillation is determined by the amount of collector current appearing at the transistor 58, the capacitance of capacitor 60, and the peak voltages of the switching transistors 62 and 64.

In the absence of an input signal from source 10, the current from the transistor 58 remains constant and the frequency of the sawtooth waveform 31 developed by the oscillator 30 is substantially fixed, as in FIGURE 5A. However, when an input signal is received by the transistors 54 and 58, the capacitor 60 charges and discharges at a different rate in accordance with the polarity and amplitude of the incoming signal whereby the frequency of the sawtooth waveform developed by the oscillator 30 is modified, as shown in FIGURE 5B. By way of example, if the voltage of the incoming signal is .3 volt, a sawtooth carrier of 13.5 kilocycles per second would experience a 40 percent frequency deviation.

The frequency modulated signal is directed from the output electrode or collector of the transistor 64 to the differentiating circuit 35 comprising a capacitor 66 and resistor 68, shown in FIGURE 4. The circuit 35 produces the sharp negative pulse 33 (FIGURE 5C) in response to the negative going steep slope of the frequency modulated sawtooth derived from the oscillator 30.

The negative pulses 33 are applied to the bases of transistors 70 and 72 through gating diodes 74 and 76 to trigger the multivibrator action of the binary divider 32. A voltage divider 78 comprising a resistive network 80 and capacitors 82 is coupled to the transistor bases for suitably biasing the bases. Upon the occurrence of a trigger pulse 33, one transistor begins to conduct while the other transistor is nonconducting. The next succeeding pulse cuts off the conducting transistor, and causes the nonconducting transistor to conduct. The transistors 70 and 72 serve as a bistable multivibrator providing one complete cycle of the square wave 84 for every two cycles of the sawtooth (FIGURE 5B) defined by two corresponding negative pulses 33. In other words, the frequency of the square wave output 84 is one-half that of the FM signal derived from the oscillator 30.

The frequency-divided square wave output 84 (FIGURE 5D) is directed from the collector of the transistor 70 to the switch 14 through an attenuator or resistance 86. The square wave FM signal 84 is subsequently recorded onto the tape 18 by means of the recording head assembly 16. The symmetry of the square wave 84 minimizes the possibility of undesirable magnetization of the record head assembly 16.

The other elements of the circuit have not been described in detail, as they are well known components that operate conventionally, and such description is not deemed necessary for setting forth the instant invention.

The invention described herein affords the use of the same record head assembly for DR or FM operation because an adjustable biasing means is employed. Furthermore, utilizing a bias signal for both functions permits using a lower record current. In addition, there is no necessity for stopping the mechanical parts in operation, or for inactivating the electronic system when switching between DR and FM. Thus a savings in time, parts, tape and editing is achieved in a simple, convenient manner by means of the inventive system.

What is claimed is:

1. a recording and reproducing system comprising:
means for supplying an information input signal;
a single record head;
a direct record channel coupled between said input signal supplying means and said record head;
a frequency modulation record channel coupled between said input signal supplying means and said record head, said channels being connected in parallel;
means for applying a bias signal to such record head;
a single reproduce head;
a utilization circuit;
a direct record reproduce channel coupled between said reproduce head and said utilization circuit;
a frequency modulation reproduce channel coupled between said reproduce head and said utilization circuit; and
a switching element for selecting either the direct record or frequency modulation channels for connection to said record and reproduce heads to conduct a recording and reproducing operation.

2. A recording system comprising:
means for supplying an input signal;
a single record head;
a direct record channel;
a frequency modulation record channel; and
a switching element for selectively coupling either the direct record or frequency modulation record channel between said input signal supplying means and said head for effective record operation.

3. A recording system comprising:
an input signal source;
a single record head;
a direct record channel;
a frequency modulation record channel, said channels being connected in parallel to said source, such frequency modulation channel comprising a binary divider for providing a symmetrical square waveform;
means for applying a bias signal to such head including means for varying such bias signal; and
a switching element for selectively connecting either the direct record or frequency modulation channel to said head for effective record operation.

4. A signal recording system comprising:
means for receiving an input signal;
a single record head;

a direct record channel;
a frequency modulation record channel, such channels being connected in parallel to said input signal receiving means;
means for applying a bias signal to such head;
a bias trap coupled to said head; and
switching apparatus for selectively coupling either the direct record or the frequency modulation channel to said trap for coupling the input signal therethrough to said head in conjunction with the bias signal for effective record operation, said trap preventing feedthrough of the bias signal to said channels.

5. A signal recording system comprising:
means for receiving an input signal;
a single record head;
a direct record channel;
a frequency modulation record channel, such channels being connected in parallel to said signal receiving means, said frequency modulation channel including an oscillator for providing a sawtooth waveform, a differentiator coupled to said oscillator for developing pulse signals in response to the sawtooth waveform, and a binary divider coupled to said differentiator for producing a symmetrical waveform in response to such pulse signals;
means for applying a bias signal to such head;
a bias trap coupled to said head; and
switching apparatus for selectively connecting either the direct record or the frequency modulation channel to said bias trap for coupling of said input signal therethrough to said head in conjunction with said bias signal for effective record operation, said trap preventing feedthrough of said bias signal to said channels.

6. A magnetic tape recorder for the recording of input signals arriving at an input terminal comprising:
a record head;
a direct record channel coupled to the input terminal;
a frequency modulation record channel coupled in parallel with the direct record channel to the input terminal, the amplitude of the frequency modulation record channel output signals being below a level which would cause saturation of the tape being recorded on;
a bias source and bias supply network coupled to said record head; and
means for selectively switching the junction of said head and bias source and bias supply network between the direct record channel and the frequency modulation record channel.

7. A signal recording system comprising:
means for receiving an information input signal;
a single record head;
a direct record channel;
a frequency modulation record channel, said channels connected in parallel to said means for receiving an information input signal;
switching apparatus for selectively connecting either the direct record or the frequency modulation channel to said head for effectively recording the information signal as a single track onto a magnetic medium that traverses the head; and
means for applying edit markers on such medium to indicate whether the information signal has been recorded by direct record or frequency modulation.

8. A reproducing system for playback of a signal recorded by frequency modulation or direct record means comprising:
a single head for transducing the recorded signal to an electrical signal;
a preamplifier circuit for amplifying the electrical signal provided by said transducer;
a utilization means;

a direct record reproduce channel;

a frequency modulation reproduce channel; and switching apparatus for selectively coupling one of said channels between said preamplifier circuit and said utilization means for effective operation.

9. A reproducing system for playback of a signal recorded by frequency modulation or direct record means comprising:

a single head for transducing the recorded signal to an electrical signal;

a preamplifier circuit for amplifying the electrical signal;

a utilization means;

a direct record reproduce channel including an amplitude equalizer;

a frequency modulation reproduce channel; and switching apparatus for selectively coupling either the direct record or the frequency modulation reproduce channel between said preamplifier circuit and said utilization means for effective operation.

References Cited by the Examiner

UNITED STATES PATENTS

| | | | |
|---|---|---|---|
| 2,629,784 | 2/1953 | Daniels | 179—100.2 |
| 2,792,449 | 5/1957 | Bottini | 179—100.1 |
| 3,037,091 | 5/1962 | Rothe | 179—100.2 |

FOREIGN PATENTS

| | | |
|---|---|---|
| 1,112,843 | 8/1961 | Germany. |

BERNARD KONICK, *Primary Examiner.*

IRVING SRAGOW, *Examiner.*

J. R. GOUDEAU, T. W. FEARS, *Assistant Examiners.*